US010341196B2

(12) United States Patent
Hamburger et al.

(10) Patent No.: US 10,341,196 B2
(45) Date of Patent: Jul. 2, 2019

(54) RELIABLY UPDATING A MESSAGING SYSTEM

(71) Applicant: BlackRock Financial Management, Inc., San Francisco, CA (US)

(72) Inventors: Elliot Hamburger, Teaneck, NJ (US); Jonathan S. Harris, Englewood, NJ (US); Jeffrey A. Litvin, New York, NY (US); Sauhard Sahi, New York, NY (US); John D. Valois, New York, NY (US); Ara Basil, Armonk, NY (US)

(73) Assignee: BlackRock Financial Management, Inc., San Francisco, CA (US)

( * ) Notice: Subject to any disclaimer, the term of this patent is extended or adjusted under 35 U.S.C. 154(b) by 149 days.

(21) Appl. No.: 15/598,641

(22) Filed: May 18, 2017

(65) Prior Publication Data

US 2017/0257280 A1  Sep. 7, 2017

Related U.S. Application Data

(62) Division of application No. 15/011,250, filed on Jan. 29, 2016, now Pat. No. 9,705,752.

(Continued)

(51) Int. Cl.
  *G06F 15/16* (2006.01)
  *H04L 12/24* (2006.01)
  (Continued)

(52) U.S. Cl.
  CPC .......... *H04L 41/20* (2013.01); *G06F 15/167* (2013.01); *H04L 51/30* (2013.01); *H04L 51/36* (2013.01);
  (Continued)

(58) Field of Classification Search
  CPC ......... H04L 41/20; H04L 51/30; H04L 51/36; H04L 63/0442; H04L 67/1004; G06F 15/167
  (Continued)

(56) References Cited

U.S. PATENT DOCUMENTS 5,913,024 A  6/1999  Green et al.
6,154,543 A  11/2000  Baltzley
(Continued)

FOREIGN PATENT DOCUMENTS

WO  WO-2004/072800 A2  8/2004
WO  WO-2008/085206 A2  7/2008
WO  WO-2010/014386 A1  2/2010

OTHER PUBLICATIONS

Roman, M., et al., "Reflective Middleware: From Your Desk to Your Hand," Reflective Middleware, IEEE Distributed Systems Online, 2001, 19 pages, vol. 2, No. 5.
(Continued)

*Primary Examiner* — Kristie D Shingles
(74) *Attorney, Agent, or Firm* — Fenwick & West LLP

(57) ABSTRACT

A messaging system enables client applications to send and receive messages. The messaging system includes independent component programs performing different functions of the messaging system. The component programs include persistent connection managers that maintain connections with the client applications, a dispatcher that establishes connections, and a message router that sends received messages to recipient applications through corresponding connections. The connection managers share a state memory containing a received message and a completion state associated with the received message. The messaging system retains the message until the completion state fulfills a completion condition. The messaging systems supports live deployment of updates the message router and dispatcher
(Continued)

because the state of the messaging system is stored independently from memory allocated to these component programs, so they may be restarted without loss of messages, connections or other state information.

20 Claims, 9 Drawing Sheets

Related U.S. Application Data

(60) Provisional application No. 62/109,512, filed on Jan. 29, 2015.

(51) Int. Cl.
    *H04L 12/58*     (2006.01)
    *G06F 15/167*     (2006.01)
    *H04L 29/06*     (2006.01)
    *H04L 29/08*     (2006.01)

(52) U.S. Cl.
    CPC ...... *H04L 63/0442* (2013.01); *H04L 67/1004* (2013.01)

(58) Field of Classification Search
    USPC .......................................................... 709/206
    See application file for complete search history.

(56) References Cited

U.S. PATENT DOCUMENTS

| | | |
|---|---|---|
| 6,338,089 B1 | 1/2002 | Quinlan |
| 6,539,093 B1 | 3/2003 | Asad et al. |
| 8,112,483 B1 | 2/2012 | Emigh et al. |
| 8,255,455 B2 | 8/2012 | Koegel et al. |
| 8,369,326 B2 | 2/2013 | Ansari et al. |
| 8,392,555 B2 | 3/2013 | Gale et al. |
| 8,453,163 B2 | 5/2013 | Kothamasu et al. |
| 8,489,674 B2 | 7/2013 | Srivastava et al. |
| 2002/0055980 A1 | 5/2002 | Goddard |
| 2003/0065711 A1 | 4/2003 | Acharya et al. |
| 2003/0145237 A1 | 7/2003 | Chang et al. |
| 2003/0149769 A1* | 8/2003 | Axberg ............... H04L 67/1097 709/225 |
| 2005/0086509 A1 | 4/2005 | Ranganathan |
| 2005/0125661 A1 | 6/2005 | Vaidyanathan |
| 2005/0138377 A1 | 6/2005 | First et al. |
| 2006/0041660 A1* | 2/2006 | Bishop ................. H04L 41/065 709/224 |
| 2006/0236125 A1 | 10/2006 | Sahita et al. |
| 2008/0016221 A1 | 1/2008 | Xu et al. |
| 2008/0127208 A1 | 5/2008 | Bedi et al. |
| 2008/0189793 A1 | 8/2008 | Kirkup et al. |
| 2009/0052675 A1 | 2/2009 | Levow et al. |
| 2009/0132813 A1 | 5/2009 | Schibuk |
| 2009/0144823 A1 | 6/2009 | Lamastra et al. |
| 2009/0172172 A1 | 7/2009 | Graham et al. |
| 2010/0005512 A1 | 1/2010 | Wahl |
| 2010/0203960 A1 | 8/2010 | Wilson et al. |
| 2010/0228973 A1 | 9/2010 | Dancer et al. |
| 2010/0229219 A1 | 9/2010 | Mendonca |
| 2011/0185171 A1 | 7/2011 | Karasawa et al. |
| 2012/0011353 A1 | 1/2012 | Hayashida |
| 2012/0072715 A1 | 3/2012 | Yonge et al. |
| 2012/0324069 A1 | 12/2012 | Nod et al. |
| 2013/0198763 A1 | 8/2013 | Kunze et al. |
| 2013/0318343 A1 | 11/2013 | Bjarnason et al. |
| 2014/0115340 A1 | 4/2014 | Lee |
| 2014/0241373 A1 | 8/2014 | Pasam et al. |
| 2014/0245262 A1 | 8/2014 | Hill et al. |
| 2015/0039891 A1 | 2/2015 | Ignatchenko et al. |
| 2015/0052575 A1 | 2/2015 | Myla et al. |
| 2015/0082025 A1 | 3/2015 | Deshpande |
| 2015/0169875 A1 | 6/2015 | Ide et al. |
| 2016/0134423 A1 | 5/2016 | Harjula et al. |
| 2017/0272332 A1 | 9/2017 | Hamburger et al. |
| 2018/0278611 A1 | 9/2018 | Tan et al. |

OTHER PUBLICATIONS

United States Office Action, U.S. Appl. No. 15/011,250, dated Sep. 8, 2016, 9 pages.

United States Office Action, U.S. Appl. No. 15/604,540, dated May 16, 2018, 16 pages.

\* cited by examiner

RELIABLY UPDATING A MESSAGING SYSTEM

CROSS-REFERENCE TO RELATED APPLICATION

This application is a divisional of U.S. application Ser. No. 15/011,250, filed Jan. 29, 2016, which claims the benefit of U.S. Provisional Patent Application No. 62/109,512, filed Jan. 29, 2015, which is incorporated by reference herein in its entirety.

BACKGROUND

The present disclosure generally relates to a messaging-oriented middleware system and, more particularly, to sending messages using connections with improved persistence during software updates.

Messaging-oriented middleware systems (also referred to herein as "messaging systems") facilitate communication between client applications distributed across diverse operating environments. For example, a messaging system enables communication between client applications executed by different servers with different operating systems. Non-persistent messaging systems store messages and state information in program memory allocated to the messaging system. However, if the computer providing the allocated memory malfunctions or restarts, the stored messages and state information are lost. As a result, the messaging system fails to deliver messages sent by its client applications and will fail to inform the affected client applications which messages were lost.

Storing messages and state information in program memory of the messaging system also complicates upgrades, patches, and other changes to software of the messaging system. To prevent unexpected malfunctions, changes to messaging systems are performed in an outage window where end users cannot use applications that rely on the messaging system for functionality. These outage windows increase the cost of system upgrades and serve as a logistical barrier that decreases the frequency of upgrades. Additionally, outage windows increase the risk associated with a software update because bugs arising from the software update cannot be fixed without a further outage window.

SUMMARY

A messaging system enables client applications to send and receive messages in a format independent of the client applications' respective operating environments. The messaging system outlined in this document includes independent component programs performing different functions of the messaging system to improve messaging system reliability and flexibility. The independent component programs of the messaging server include persistent connection managers that maintain connections with the client applications as well as an easily updateable message router that directs received messages to recipient applications through corresponding network connections. The component programs also include an easily updateable dispatcher that receives connections and manages the connection managers. Separating the function of the messaging system into independent programs are designed to allow for in-place upgrades. Furthermore separating the functions improves performance because the messaging system may execute multiple instances of a given program module (e.g., the connection manager). Additionally, the dispatcher and message router may be updated or restarted without dropping connections maintained by the connection manager. As a result, the messaging system supports live deployment of software updates that modify the function of the message router and dispatcher but not the connection manager.

The messaging system stores messages and state information in a memory that is independent from memory allocated to the programs that perform the various messaging system functions. The state information includes the state of connections as well as the routing state of the message and completion (i.e., delivery) state of the message. Storing the messages and state information in memory independent from the memory allocated to the component programs supports live deployment of updates to the messaging system by preserving messages and state information during updates. For example, during a software update to the message router or dispatcher, the messaging system maintains network connections using the connection managers. During the update, the messaging system may further receive messages from client applications through connection managers, store the messages in shared memory, and forward the message router references to the received messages for processing through a persistent inter-process communication messaging queue.

To send a message between client applications, the messaging system may perform the following example steps. The messaging system receives the message through a source network connection established with a source client application executed by a client device. The message includes a body containing information and a header identifying a topic on which a recipient client application has subscribed. The connection manager stores the message in a shared memory accessible by all connection managers in the pool. The shared memory also stores a completion state associated with the message. The message router identifies a destination network connection for the message based on the header of the message. The messaging system sends the message to the destination client application using a connection manager that maintains the destination connection.

The messaging system retains the message in shared memory until the completion state of the message fulfills a completion condition jointly generated by the message router and pool of connection managers. The completion state is stored in a memory location inaccessible to the message router, which maintains a separate routing state indicating messaging instructions sent to connection managers. When the message router issues the last instruction about a message to a connection manager, it sets a sentinel to indicate how many actions should be expected for that message (referred to as a relinquish limit). Connection managers increment a relinquish count each time the message is routed. When that relinquish count reaches the relinquish limit, the completion condition has been met and the message is removed from shared memory by one of the connection managers. As this is an asynchronous system, this design ensures that messages are correctly deleted regardless of the order of events. Thus, the router may issue a deletion routing instruction commanding deletion of the message when a completion condition is met, and the message router uses the routing state to generate the completion condition, however the message router does not itself perform the deletion, and instead sends the completion condition to a connection manager as part of the routing instruction. This completion condition is shared among all connection managers via shared state, and any connection manager can perform the deletion when the completion condition has been met.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
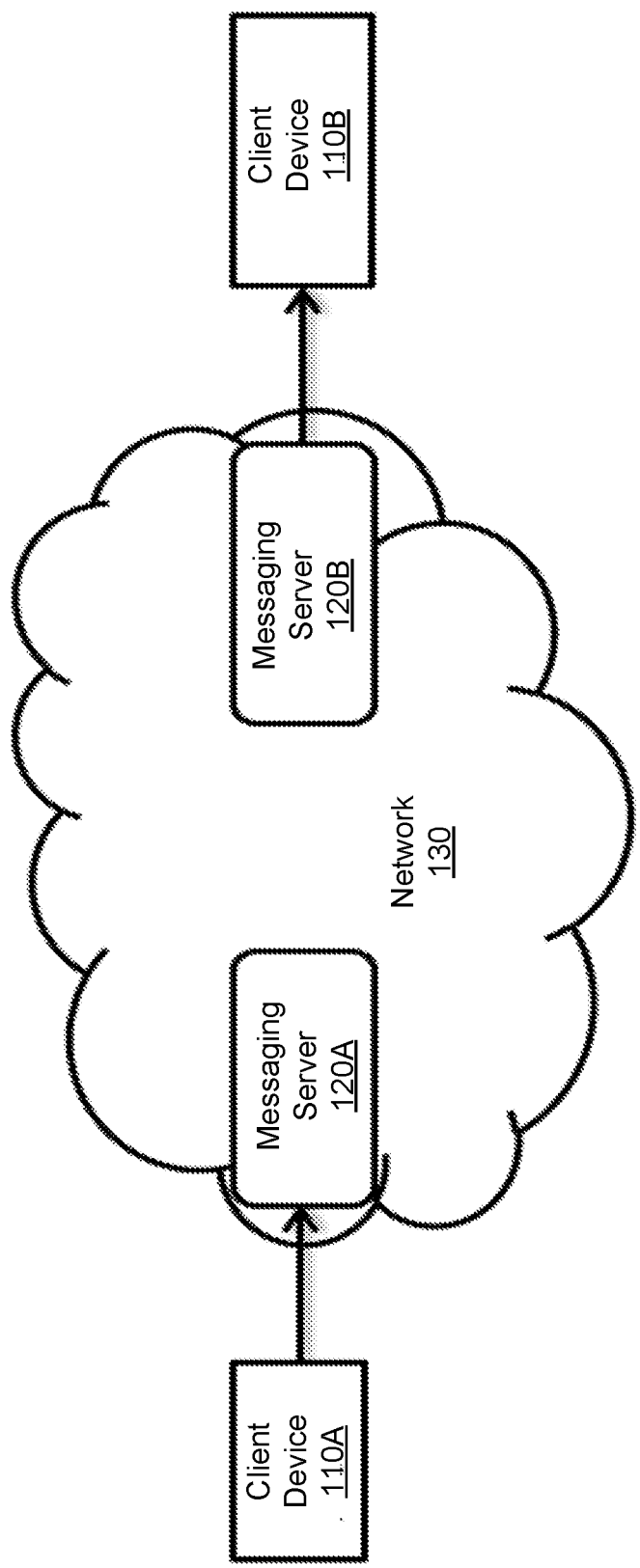
FIG. 1 is a block diagram of a system environment including a messaging system and client devices, in accordance with an embodiment.

FIG. 1 is a block diagram of a system environment including messaging system and client devices 110A and 110B (generally, client devices 110), in accordance with an embodiment. The messaging system includes messaging servers 120A and 120B (generally, messaging servers 120), which are communicatively coupled to each other and to client devices 110A and 110B through the network 130 (which may include a cloud of messaging servers 120).

The client devices 110 are computing devices including both user devices and servers. User devices include applications to enable users to view, input, manipulate, and modify information, which may be stored locally or retrieved from another device. Example user devices include desktop computers, laptop computers, servers, smartphones, tablet computers, or any other type of network-enabled device. Servers include databases that store information or programs that generate, modify, and delete information, both automatically and in response to commands from user devices and other servers. Example servers include rack-mounted servers with a Unix-based operating system. Some client devices 110 have characteristics of both user devices and servers.

The messaging system facilitates communication between client applications executed by client devices 110 by providing messaging-oriented middleware functionality. A client application communicates with at least one other client application through messages passed by the messaging system. In a typical use case referred to herein, client device 110A executes a client application that communicates with another client application executed by client device 110B through the messaging system. However, different client applications executed by the same client device 110 may communicate through the messaging system, and different instances of the same client application may communicate through the messaging system.

The messaging system includes one or more messaging servers 120 (e.g., messaging servers 120A and 120B), which are co-located with client devices 110, remotely located from client devices 110 (e.g., in a data center), or geographically dispersed (e.g., in a plurality of data centers, virtual machines, or cloud computing environments). Using a plurality of messaging servers 120 beneficially improves reliability and scalability of the messaging system. For example, the messaging system may include resiliency functions that identify when a messaging server 120 has failed and distribute the functionality of the messaging server 120 to other active messaging servers 120 or to a backup messaging server 120. Furthermore, the messaging system uses load balancing to distribute messages between similar client applications to improve responsiveness.

As used herein, a "message" refers to any communication between client applications. Example messages include a request for information from a client application, a response including the requested information, unrequested information (e.g., an update, a status report), a command for a client application, and a confirmation indicating a result of the command. The message may include encoded information representing text, numerical data, structured data (e.g., a database table), audio data, image data, video data, programmatic commands, or a combination thereof. The message may further include a header with routing information used to identify message recipients or topics for that recipients are registered to receive.

The messaging system sends and receives messages through connections with client applications, which are typically persistent connections provided by a protocol with guaranteed transmission (e.g., Transmission Control Protocol (TCP), Stream TCP). Using a guaranteed-delivery protocol beneficially improves reliability of the messaging system and simplifies development of client applications that interface with the messaging system. In general, the messaging system receives a message, stores the message, identifies one or more client applications to receive the message, and sends the message to the identified client applications. Typically, the messaging system retains the message in storage only until the messaging system verifies delivery of the message to the identified client applications.

The messaging system supports one or more messaging modes, which indicate the number of message recipients and whether a response is expected. The messaging modes include broadcast mode, load balanced request/response (semaphore) mode, session (continuous semaphore) mode, fanout request mode, inter-process communication (IPC) mode, or a combination thereof.

In broadcast mode, a client application sends a message to one or more client applications without expecting a response. The broadcast message indicates a topic to which the client application is publishing the message. The messaging system delivers the broadcast message to client applications subscribed to the topic. A client application may both publish and subscribe to a topic, and multiple client applications may publish to a topic. If no client application is subscribed to the topic, then the messaging system does not deliver the broadcast message to any client application. To reply to a broadcast message, a client application may publish a broadcast message to a topic to which the publishing client application is subscribed or may use a different messaging mode.

In semaphore mode, a client application sends a single request to a specified client application and expects one or more response messages from the other client application. In continuous semaphore mode, a client application sends multiple request messages to a specified client application and expects one or more responses from the other client application. In a fanout request mode, a client application sends request messages to all client applications listening on a particular topic and expects to receive response messages from all of them. For example, a request mode message is sent to all client applications of a particular program type, belonging to a particular organization, or both. In IPC mode, two client applications exchange messages. For example, two client applications on the same client device 110 may exchange messages in IPC mode to facilitate remote method calls or execution or communication between two different operating environments.

The client devices 110 and the messaging servers 120 are connected via a network 130, which may be any suitable communications network for data transmission. The network 130 uses standard communications technologies and/or protocols and can include wide-area networks (e.g., the Internet), local-area networks (e.g., an organization's intranet), or both. In another embodiment, the network 130 includes custom and/or dedicated data communications technologies.

Typically, both client devices 110 and messaging servers 120 include hardware and software to connect to network 130 (e.g., via Ethernet, Wi-Fi, or other telecommunication technologies), store information (e.g., volatile-memory, non-volatile memory, another computer-readable medium), and process information (e.g., a processor). A client device 110 or messaging server 120 may optionally include hardware and software to present information (e.g., a display device, a projector, an audio speaker), to receive user commands and other user inputs (e.g., an input peripheral, a microphone, a camera), or both.

Although FIG. 1 illustrates two instances of the client devices 110 and the messaging servers 120, the system environment may include any number of these devices. The messaging system may include a single messaging server 120 or a plurality of messaging servers 120. Where the messaging system includes a plurality of messaging servers 120 in a data center, the messaging servers 120 may be hierarchically organized, such as in a tree structure with one messaging server 120 serving as a root node for the data center, or with any other topology. The messaging system may be distributed across a plurality of data centers. In this case, one or more messaging servers 120 may serve as global hubs that coordinate communication between messaging servers 120 in different data centers. If the messaging servers 120 are organized in a tree hierarchy within the data center, the messaging servers 120 serving as root nodes of respective data centers may also be child nodes with respect to global hub nodes.

System Architecture

Figure 2:
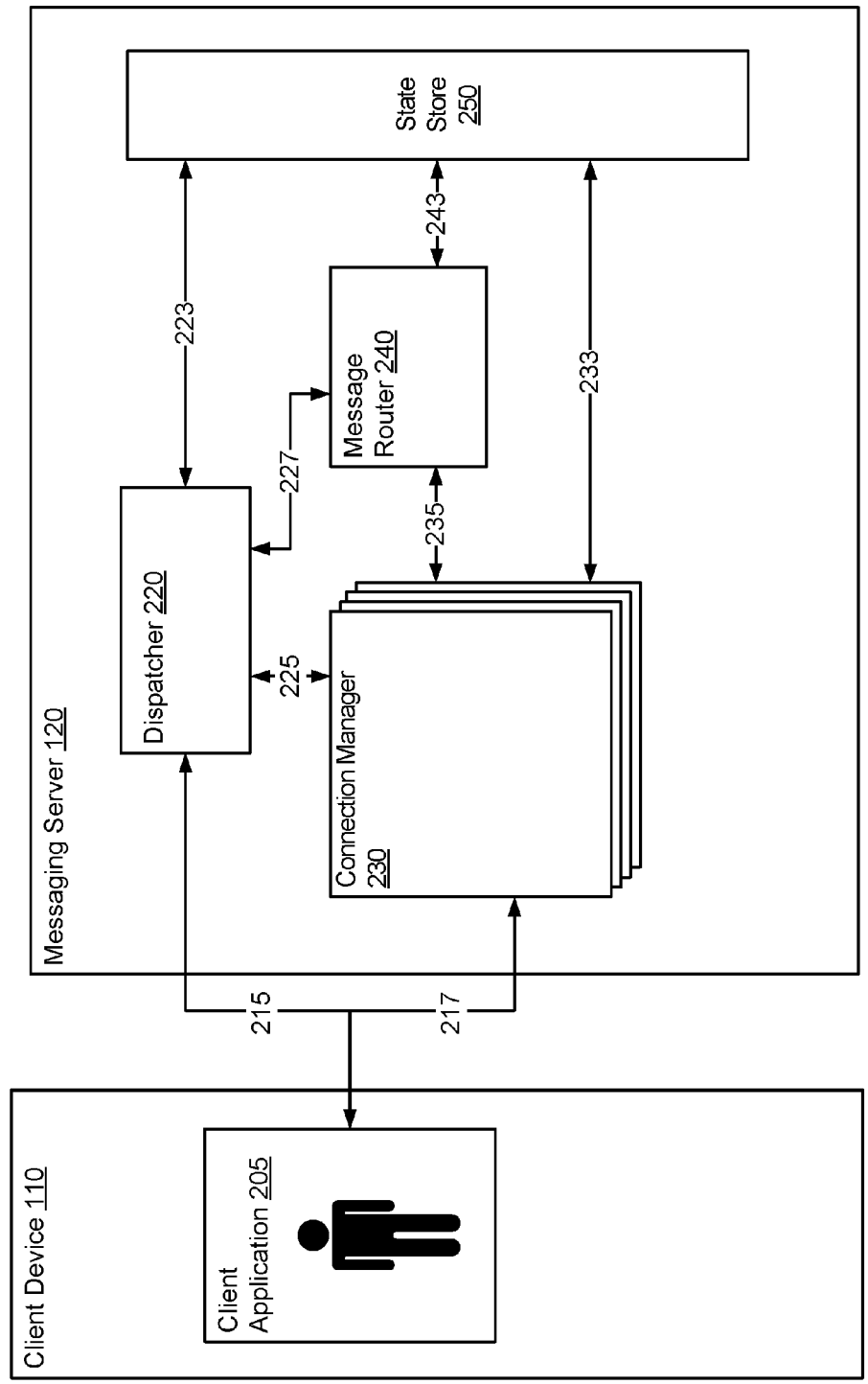
FIG. 2 is a block diagram illustrating modules within a client device and messaging server, in accordance with an embodiment.

FIG. 2 is a block diagram illustrating modules within a client device 110 and messaging server 120, in accordance with an embodiment. Some embodiments of the client device 110 and messaging server 120 have different or additional modules than the ones described here. Similarly, the functions can be distributed among the modules in a different manner than is described here, and the modules of the messaging server 120 may be executed by multiple messaging servers 120.

The client device includes one or more client applications 205. A client application 205 refers to any application that communicates through the messaging system 120. Example client applications support database management, person-to-person communication, multimedia streaming, operations management, accounting, regulatory compliance, asset trading, asset monitoring, or any other enterprise or recreational function. A client application may include an application programming interface (API) that other programs may use to request information from the client application 205 or to send commands to the client application 205. A client application 205 may include a graphical user interface (GUI) for a user to review, provide, and manipulate information.

The client application 205 generates a message for the messaging system, and sends the message to a messaging server 120. From the standpoint of the messaging system 120, the message is raw data that is not interpreted by the messaging system itself. This data could represent anything, such as raw text, structured data, a serialized Java object or a structured document in JavaScript Object Notation (JSON) or Extensible Markup Language (XML). To generate a message, the client application 205 generates a message body that incorporates the information and a message header that identifies a type of the message and any necessary routing information. For example, the client application 205 may encode the information into a byte format. As part of encoding the information, the client application 205 may encrypt the information to improve security. As expected, the client application 205 may also receive messages from the messaging server 120.

The client application 205 generates a header with parameters may include any information not part of the main body of content of the message, such as a messaging mode (e.g., broadcast mode, semaphore mode) and one or more topic identifiers corresponding to the messaging mode, or any other necessary routing information. For the broadcast mode, the topic identifier identifies which recipient client applications 205 are subscribed. For other messaging modes (e.g., semaphore mode, request mode, IPC mode), a publish subscribe model or a direct addressing model may be used such that a set of one or more receiving applications 205 use a semaphore register for a topic identifier.

The messaging server 120 is comprised of three separate programs modules including a dispatcher 220, one or more connection managers 230, a message router 240, and a state store 250.

The client application 205 is communicatively coupled to the dispatcher 220 and connection manager 230 by network connections 215 and 217, respectively. The client application 205 is not necessarily simultaneously coupled to the dispatcher 220 and connection manager 230 by network connection 215 and 217, however. For example, the client application 205 establishes network connection 215 with the dispatcher 220, which transfers the network connection 215 to the connection manager 230, thereby establishing network connection 217. The network connections 215 and 217 are generally transport-layer network connections implemented using connection oriented communications protocol having a guaranteed transmission mechanism (e.g., TCP, stream TCP). However, the transport-layer network connections 215 and 217 may be replaced or supplemented by another connection oriented network communication mechanism.

The dispatcher 220 is communicatively coupled to the connection manager 230 using IPC socket connections 225. The IPC socket connections 225 enables ordered reliable sending of datagrams, stream, and file descriptors between processes in the operating system kernel, so the IPC socket connections 225 may be used to pass network connections (e.g., 215 and 217) between program modules (e.g., 220 and 230) executed within the same operating environment. For example, the IPC socket connections 225 may be a Unix domain socket. The dispatcher 220 is similarly coupled to the message router 240 using IPC socket connection 227.

The message router 240 is connected to each the connection manager 230 through a pair of messaging queues 235, one in each direction. These queues 235 are an IPC mechanism that delivers data objects in the same order they were sent. This transmission of data objects is reliable and persistent. In other words, the messaging queue has a first in, first out (FIFO) structure. A messaging queue includes internal structure that separates discrete data objects placed in the messaging queue 235, which facilitates reading of the messaging queue by a recipient component program. One example messaging queue 235 is a Portable Operating System Interface (POSIX) messaging queue. Data objects in a messaging queue 235 are generally stored in memory allocated to the kernel of an operating system executed by a messaging server 120. Alternatively or additionally, data objects in a messaging queue 235 are stored in a file system or other kernel persistent memory such as state store 250.

The dispatcher 220, the connection manager 230, and the message router 240 may access, write, modify, and delete data in the shared memory 250 through memory connections 223, 233, and 243, respectively. The shared memory 250 may be memory mapped location accessible by the program modules or a subset thereof. Accordingly, different program modules may share the same objects in memory, facilitating inter-process communication between the program modules. As an example, the memory connections 223, 233, and 243 access POSIX memory mapped files. However, a given program component cannot necessarily access all memory locations in the shared memory 250. Instead, some memory locations are accessible only to a subset of the component programs, as described in further detail below.

The dispatcher 220 establishes network connection 215 with a client application 205 in response to receiving a connection request from the client application 205.

Having established the network connection 215, the dispatcher 220 selects a connection manager 230 and transfers the network connection 215 to the selected connection manager 230. The dispatcher 220 selects a connection manager 230 according to a load balancing mechanism. A variety of load balancing mechanisms are possible. For example, the dispatcher 220 may loading balance by determining a utilization rate among connection managers 230 accessible by the dispatcher 220. For example, the utilization rate may refer to a number of the connection manager's network connections. After selecting a connection manager 230, the dispatcher 220 transfers the connection 215 to it through the IPC socket connection 225. As part of transferring a network connection, the dispatcher 220 stores a connection state in state store 250. The connection state describes the network connection 215 and associates the network connection with the selected connection manager 230. Establishing a connection 217 is described in further detail with respect to FIG. 3.

The connection manager 230 maintains network connections transferred from the dispatcher 220. The connection manager 230 sends and receives messages through network connection 217. The connection manager 230 stores received messages by storing the message body, the message header, or both in state store 250. The connection manager 230 notifies message router 240 of the received message by forwarding a reference to the message to its associated messaging queue 235. For example, the connection manager 230 generates a handle to identify the message. The handle may correspond to the storage address of the message in the state store 250. The connection manager 230 transfers the handle, the message header, or both to the message router 240 through the messaging queue 235.

Additionally, connection managers 230 process (e.g., assemble, send, delete) messages in response to message routing instructions received from the message router 240 through the messaging queue 235. For example, a message routing instruction to send a message includes a message header and a message handle. The connection manager 230 accesses the message body corresponding to the message handle from the queue 235, assembles a message including the message body and the message header, and sends the message to one or more recipients client applications based on the topic identified by the message header. For example, the connection manager 230 sends the message through network connection 217 to the client application 205 on the client device 110.

Because a message may be sent to multiple recipients, multiple connection managers 230 may share access to the message in the shared memory 250. To ensure that a message is retained until it has been sent to all intended recipients, the connection manager 230 may access and update a completion state associated with the message in the shared memory 250. The completions state indicates completion of routing instructions related to a message. For example, in response to a routing instruction to send a message, the connection manager 230 updates the completion state to reflect completion of the routing instruction. In response to a routing instruction to delete a message, a connection manager 230 compares the completion state with a completion condition included in the routing instruction to delete the message. If the completion state fulfills the completion condition, the connection manager 230 deletes the message. If the completion state does not fulfill the completion condition, the connection manager will simply leave the message as is, as it is presumed that another connection manager still needs to act on a routing instruction with the message in order to fulfill the completion condition.

The message router 240 receives a reference to a received message from a connection manager 230 and generates routing instructions for one or more connection managers 230 to deliver the message. The reference to the received message may include a message handle, a message header, or both. The message router 240 determines one or more topic identifiers of the message based on the message header. For example, for a broadcast message, the message router 240 determines recipient client applications 205 that are subscribed to a topic indicated by a topic identifier in the message header. The message router 240 then determines the network connections 217 corresponding to the recipient client applications 205, and determines the connection managers corresponding to the determined networked connections 217. The message router 240 sends those connection managers 230 routing instructions to send the message to the recipient client applications 205 using the determined connections 217. The routing instructions include a message handle as well as a message header that may include the topic identifier and in some instances the messaging mode as well. The routing instruction is delivered over the messaging queue 235 to a particular connection manager 230 in the same order they were sent by the message router 240 to ensure predictable behavior. For example, ensuring in-order delivery of instructions to a connection manager 230 ensures that the recipient client application 205 receives the messages in the same order they were sent by the sender client application 205.

The message router 240 maintains a routing state that is associated with a message in state store 250. The routing state of a message corresponds to the routing instructions issued to connection managers 230. For example, as part of issuing a routing instruction, the message router 240 updates the message's routing state to reflect that the routing instruction has been sent to the connection manager 230. When the message router 240 sends a last routing instruction pertaining to a message handle, the message router 240 determines a completion condition and attaches the completion condition to the last routing instruction. In one embodiment, the completion condition is the touch count. The last routing instruction may either be the last substantive action to be taken with respect to the message, or it may be an additional routing instruction sent after the routing instruction handling the last substantive action to explicitly request deletion of the message identified by the message handle when an included completion condition is fulfilled. Using the completion condition, the connection managers 230 tasked with fulfilling the last routing instruction can independently verify whether the message is ready for deletion.

The state store 250 maintains state information accessible to at least a subset of the component programs 220, 230, and 240 and maintained by the component programs, as described above. The state information includes message bodies, message headers, a completion state, a routing state, and a connection state. In some embodiments, the state store 250 is segmented so that different modules may access and modify only a subset of the state information. For example, the completion state and message bodies are accessible only to the connection managers 230, and the routing state is accessible only to the message router 240. Using an independent routing state and completion state (instead of a hybrid state stored in a memory shared by the connection managers 230 and message router 240) significantly improves performance because the message router 240 may update the routing state of a message independently of the connection managers 230 accessing and updating the completion state of the message.

The state store 250 may contain message payloads accessible to the connection managers 230, and message headers accessible to the message router 240.

Additionally, the connection managers 230 and message router 240 pass message headers between them through messaging queue 235. The state store 250 further contains a table of connection states describing the network connections 215 and 217. The connection states are accessible by the connection managers 230, the dispatcher 220, or both. For example, the table entry for a network connection 217 may include any one or more of a socket used by the corresponding connection manager 230, an assigned UID of the socket or corresponding client application 205, and authentication information.

The state store 250 is hosted on memory allocated independently from the dispatcher 220, and message router 240, so a planned restart and/or update to any of these programs will not result in the loss of the state information.

Updates to the dispatcher 220 may result in delays to establishing new connections, but the connection manager 230 may maintain existing connections while the dispatcher 220 is updated. Similarly, updates to the message router 240 may delay routing of received messages, but the state store 250 that contains the received messages, routing state, and completion state is not affected by changes to the message router 240.

Establishing a Connection with a Client Application

Figure 3:
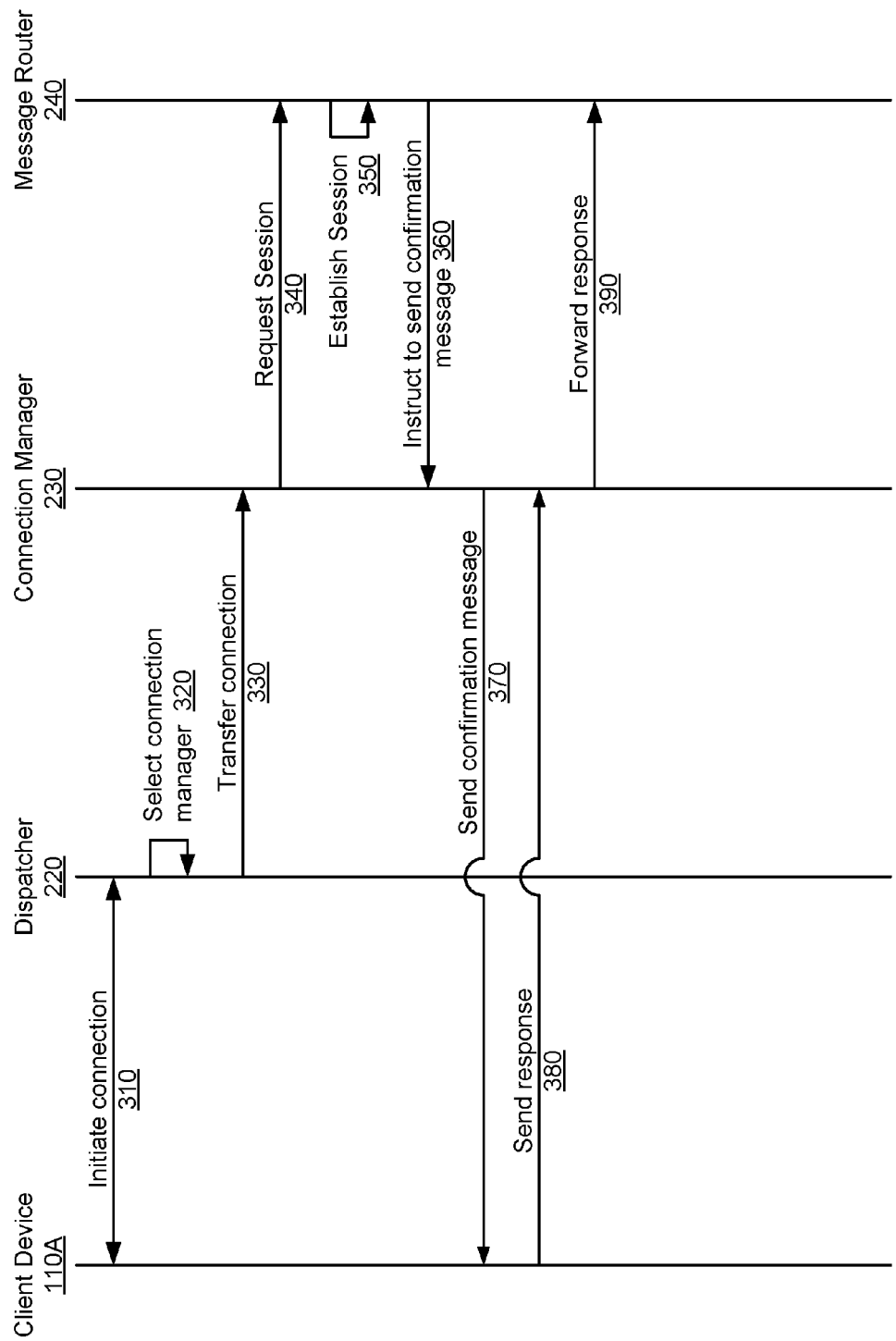
FIG. 3 is an interaction diagram illustrating a client application establishing a connection with the messaging system, in accordance with an embodiment.

FIG. 3 is an interaction diagram illustrating a client application establishing a connection with the messaging system, in accordance with an embodiment. The client device 110A (e.g., client application 205) initiates 310 network connection 215 with the dispatcher 220. The client device 110A initiates 310 the connection by contacting the dispatcher 220 at a socket and waits for establishment of the network connection 215. The dispatcher 220 accepts the network connection 215 and acknowledges the establishment of network connection 215 to the client device 110A.

The dispatcher 220 selects 320 a connection manager 230. As described previously, the dispatcher 220 selects 320 the connection manager 230 to ensure load balancing among connection managers 230. The dispatcher 220 transfers 330 the connection to the selected connection manager 230. To transfer the connection the dispatcher 220 generates a UID for the network connection 215 and identifies host information of the client application 205 and/or the client device 110A. The dispatcher 220 sends the UID for the network connection and the host information through IPC socket connection 225. The host information may include a socket assigned to the client device 110A or the client application 205, or some other signifier of where the connection is to route messages so that they arrive at the client application 205.

The connection manager 230 requests 340 a session from the message router 240. For example, the connection manager 230 may request 340 the session by sending a data object including the host information (or the UID) to message router 240 through messaging queue 235. The message router 240 establishes 350 a session based on any received information. For example, establishing a session may include the message router 240 generating a confirmation message and storing the confirmation message in the state store 250. The confirmation message may include the received information. The message router 240 instructs 360 the connection manager 230 to send the confirmation message to the client device 110A. For example, the message router 340 generates and sends a routing instruction to the connection manager 230 through messaging queue 235. In response to the routing instruction, the connection manager 230 establishes network connection 217 and sends the confirmation message to the client device 110A through the network connection 217. Network connection 217 is established at a different socket from the socket used by the dispatcher 220 to accept network connection 215.

The client device 110A (e.g., client application 205) accepts the network connection 217. The client device 110A also sends 380 a response message to the connection manager 230 through network connection 217. The response message includes information identifying the client application 205, such as a program type of the client application 205 and instance name of the client application 205. The connection manager 230 stores the response message in the state store 250 and forwards 390 the reference to the response message to the message router 240. Using the response message, the message router 240 infers that network connection 217 is active and stores the connection in association with the data object (e.g., UID, host information) used to generate the connection in the state store 250. Subsequently, the message router 240 instructs the connection manager 230 to route a message to client application 205 over network connection 217.

In response to a loss of network connection 217, the client application 205 may attempt to re-establish a connection by initiating network connection 215 with the dispatcher 220. In response to a loss of network connection 217, the connection manager 230 sends a data object to the message router 240 indicating the UID of the lost network connection 217. The message router 240 removes the session state it is maintaining in state table 250, and subsequently does not issue instructions for the connection manager 230 to route any more messages through the lost network connection 217.

Sending a Message between Client Applications

Figure 4A:
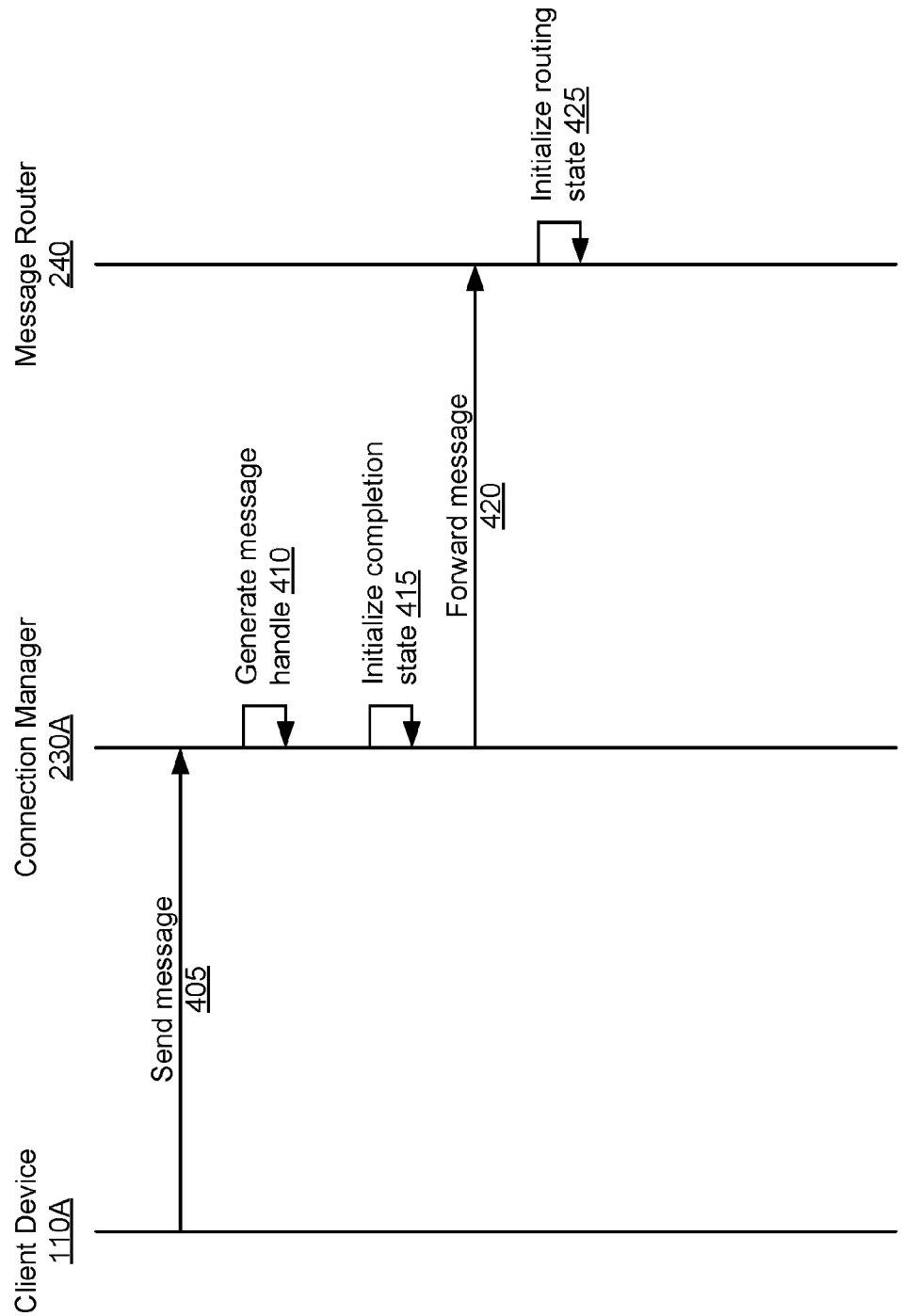
FIG. 4A is an interaction diagram illustrating a client application sending a message to the messaging system, in accordance with an embodiment.
Figure 4B:
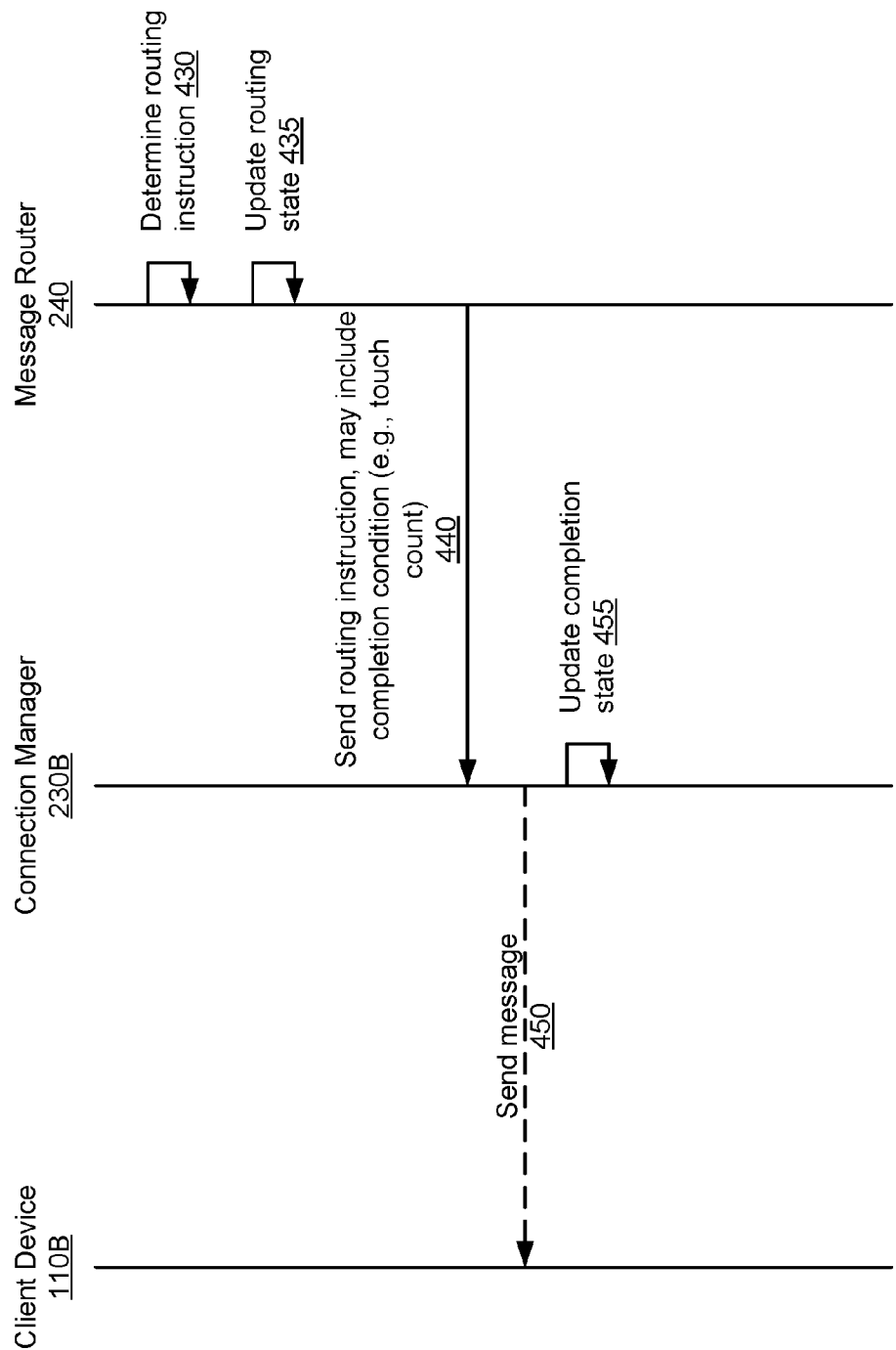
FIG. 4B is an interaction diagraming illustrating the messaging system delivering the message sent to the messaging system in FIG. 4A.

FIGS. 4A and 4B are interaction diagrams illustrating a client application sending a message to the messaging system, and the messaging system delivering the message, in accordance with an embodiment. In some embodiments, the method may include different and/or additional steps than those described in conjunction with FIGS. 4A and 4B. Additionally, in some embodiments, the method may perform the steps in different orders than the order described in conjunction with FIGS. 4A and 4B, such as performing steps in parallel.

The client device 110A (e.g., client application 205) sends 405 a message through network connection 217. In response to receiving the message, connection manager 230A stores the message in state store 250 and generates 410 a message handle. For example, the message handle identifies the message's storage location in the state store 250. The connection manager 230A initializes 415 a completion state associated with the message in the state store 250. Initializing a completion state refers to allocating memory to store the completion state, setting an initial value of the completion state, or both. In one implementation, the completion state is a relinquish count that indicates a number of routing instructions that all connection managers 230 in total have processed, such that if the relinquish count reaches a relinquish limit, the message is to be deleted. To initialize the relinquish count, the connection manager 230A sets the relinquish count to zero. The connection manager 230A forwards 420 the message to the message router 240. To forward the message, the connection manager 230 forwards the message handle and message header to the message router 240.

The message router 240 initializes 425 a routing state associated with the message in the state store 250. The routing state corresponds to routing instructions that the message router 240 has issued to connection managers 230 for a message. Initializing a routing state refers to allocating memory to store the routing state, setting an initial value of the routing state, or both. In one implementation, the routing state is a touch count that indicates a number of routing instructions that the message router 240 has issued for a message. Initializing the routing state may also include initializing a completion condition that the message router 240 communicates to the connection manager 230 upon issuance of a last routing instruction for the message. For example, the connection manager 230 uses a touch count sent as the completion condition to set the relinquish limit indicating the total number of routing instructions to be issued for a message before the messaged is to be deleted. Example initial values of the relinquish limit include −1, another negative number, null, and NaN (not a number), and example later-set values for the relinquish limit include any positive integer.

Referring to FIG. 4B, the message router 240 determines 430 routing instructions for connection managers 230, including a routing instruction for connection manager 230B. The message router 240 determines 430 routing instructions by determining one or more recipient client applications 205 from the message header. For example, the message router 240 determines a recipient client application from the messaging mode and the one or more topic identifiers. The message router 240 identifies client applications 205 subscribed to the topic corresponding to the topic identifier included in the message header. For each identified client application 205, the message router 240 generates a routing instruction including the message handle and recipient handle. The message router 240 may generate other routing instructions, such as a routing instruction to delete a message once the message is sent to all its recipient client applications 205.

The message router 240 updates 435 the routing state as it generates routing instructions based on the inbound message to be routed. For example, if the routing state is a touch count indicating a number of routing instructions issued for a message, the message router 240 indicates that it did indeed generate the routing instructions it was instructed to generate by incrementing the message's touch count in response to generating each routing instruction for the message. For a routing instruction to delete a message, the message router 240 may update the routing state and generate a completion condition for the message. As an example completion condition, the message router 240 may require that the relinquish count of a message equals a relinquish limit equal to the total number of routing instructions issued for the message (which may be the touch count itself). The message router 240 communicates the completion condition to the connection manager 230. The connection manager 230 receives the completion condition and sets the relinquish limit using the completion condition. For example, if the touch count is the completion condition, the connection manager 230 sets the relinquish limit using the touch count. In response to routing instructions not associated with a message, such as an instruction to maintain a network connection 217, the message router 240 does not update a routing state. Issuing routing instructions and updating the routing state is described in further detail with respect to FIG. 5.

The message router 240 sends 440 routing instructions to the connection manager 230B through that connection manager's 230B associated messaging queue 235. To send 440 a routing instruction, the message router 240 accesses a mapping between topic identifiers and established sessions in state table 250 to identify the appropriate connection manager 230 that can service client applications 205 through corresponding network connections 217 by accessing a mapping between topic identifiers and the network connections 217. To delete a message from the state store 250, the message router 240 and appends the completion condition to the last routing instruction sent for that message to the appropriate connection manager 230B.

The connection manager 230B processes a routing instruction according to the type of routing instruction. For a routing instruction to send a message, the connection manager 230B sends 450 the message identified by the routing instruction to the client device 110B and recipient client application 205 through the corresponding network connection 217. The connection manager 230B also updates 455 the completion state associated with the message in the state store 250. For example, if the completion state is a relinquish count, and the connection manager 230B increments the relinquish count in response to sending 450 the message. For a routing instruction to delete a message, the connection manager 230B updates 455 the completion state and compares the completion state to a completion condition included in the routing instruction. If the completion state fulfills the completion condition, the connection manager 230B deletes the message from the state store 250. Processing a message and updating the completion state is described in further detail with respect to FIG. 6.

Routing a Message While Maintaining a Routing State

Figure 5:
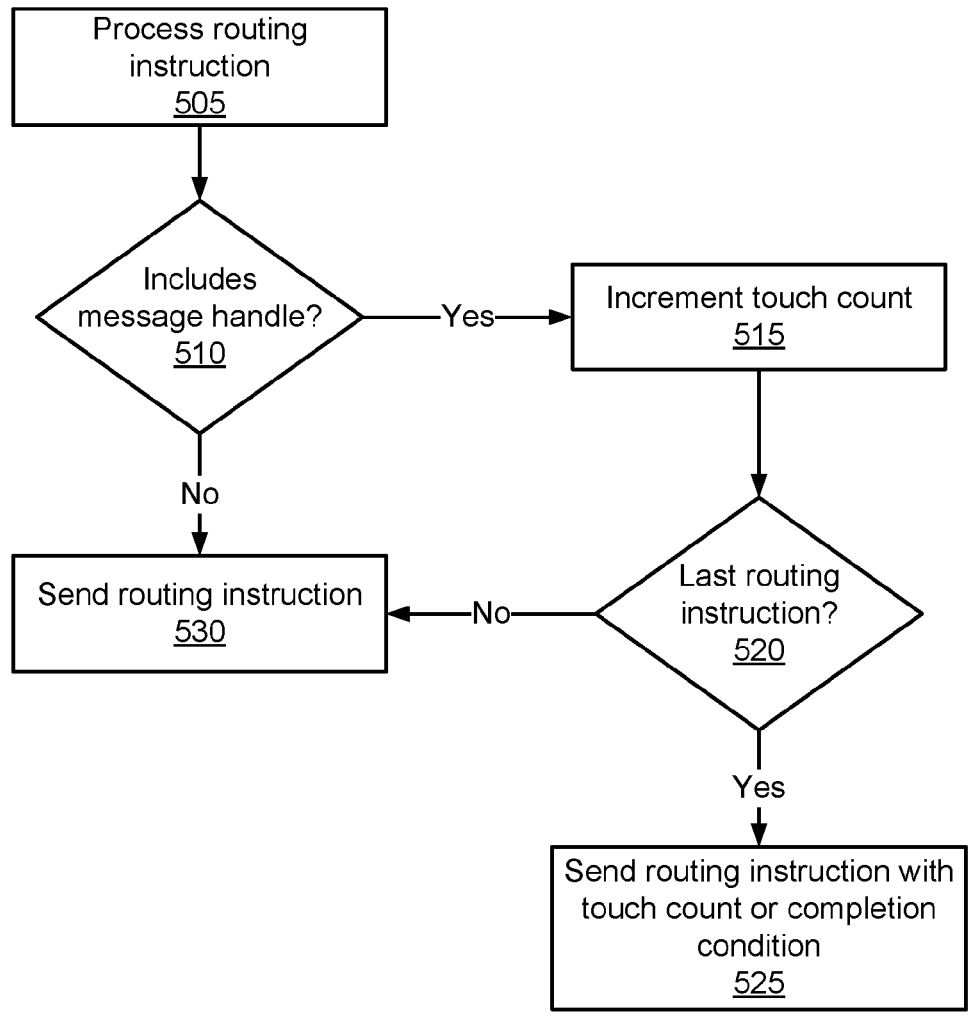
FIG. 5 is a flowchart illustrating an example process of the message router sending a routing instruction to a connection manager, in accordance with an embodiment.

FIG. 5 is a flowchart illustrating an example process of the message router 240 sending a routing instruction to a connection manager 230, in accordance with an embodiment. The routing instruction causes the connection manager 230 to send a message to a client device 110 or to delete a message from the state store 250. In the illustrated example, the message router 240 maintains the routing state using a touch count.

The message router 240 process 505 one or more routing instructions for a message. The message router 240 determines 510 whether the routing instruction includes a message handle. If 510 the routing instruction includes a message handle (e.g., routing instructions to send or delete a message), the message router 240 increments 515 a touch count associated with the message. The message router 240 also determines 520 whether a routing instruction is a last routing instruction for a message. If 520 the routing instruction is the last routing instruction, the message router 240 appends the completion condition to the routing instruction and sends 525 the routing instruction to the connection manager 230. The connection manager 230 uses the completion condition to set the relinquish limit. If 520 the routing instruction with a message handle is not the last routing instruction, or if 510 the routing instruction does not include a message handle, the message router 240 sends 530 the routing instruction (without the completion condition).

As an extended example, the message router 240 may process 505 a first routing instruction for a first connection manager 230 to send a message and second routing instruction for a second connection manager 230 to delete that same message. The message router 240 determines 510 that the message includes a message handle, so the message router 240 increments 515 the touch count. Supposing the touch count is initialized to zero, the message router 240 increments 515 the touch count to two (once for each routing instruction). For the first routing instruction, the message router 240 determines 520 that the routing instruction is not a last routing instruction (because it is not a deletion routing instruction) and sends 530 the first routing instruction without the completion condition. For the second routing instruction, the message router 240 determines 520 that the routing instruction is a last routing instruction (because it is a deletion routing instruction) and sends 525 the second routing instruction with the completion condition (in this example, the touch count incremented to two).

Figure 6:
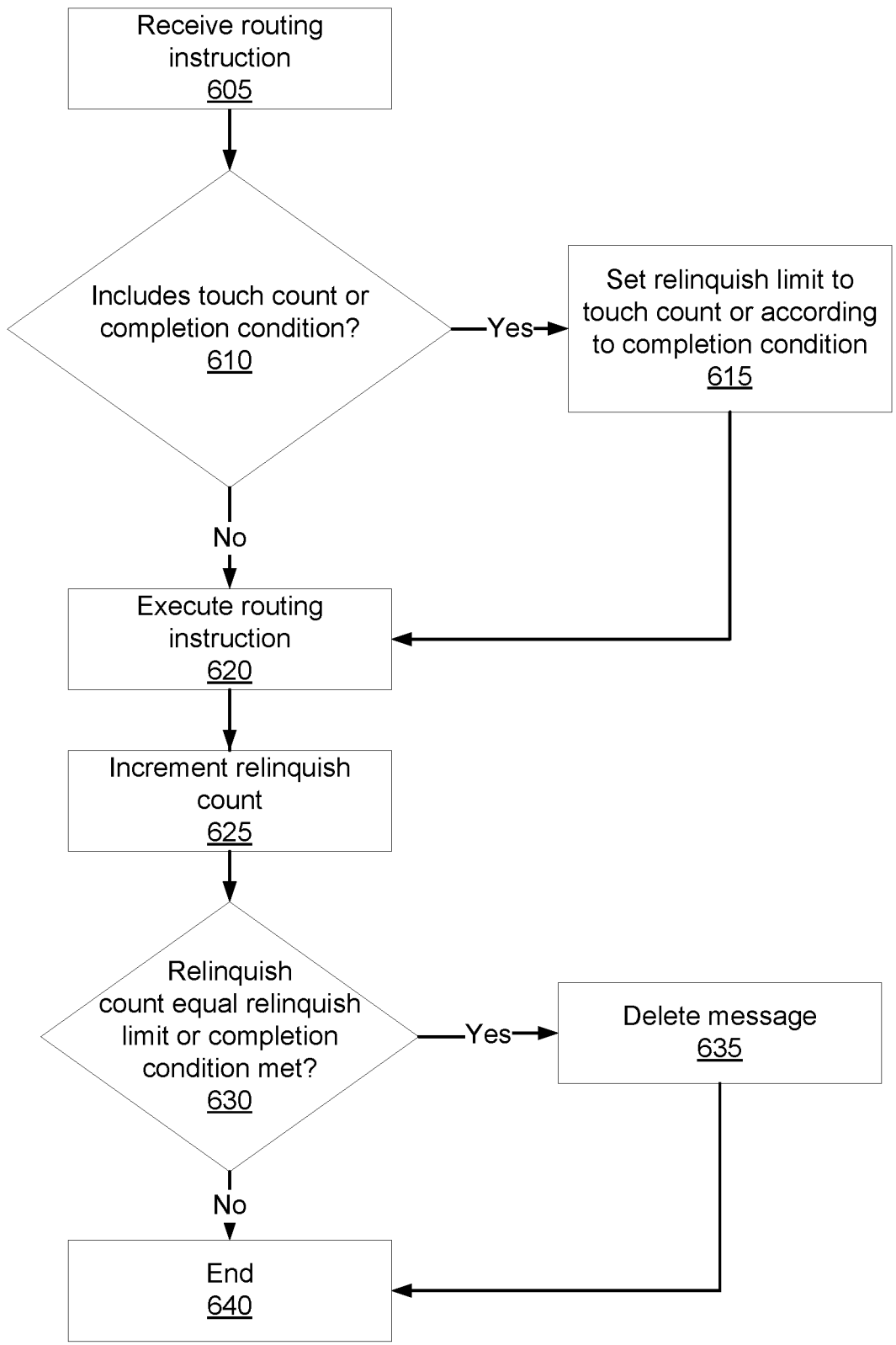
FIG. 6 is a flowchart illustrating an example process of a connection manager processing a routing instruction, in accordance with an embodiment.

FIG. 6 is a flowchart illustrating an example process of a connection manager 230 processing a routing instruction, in accordance with an embodiment. In the illustrated example, the connection manager 230 maintains the completion state using a relinquish count and tracks the completion condition using a relinquish limit.

A connection manager 230 receives 605 a routing instruction and determines 610 whether the routing instruction includes a completion condition. If 610 the routing instruction includes a completion condition, the connection manager 230 sets 615 the relinquish limit according to the completion condition (e.g., according to the touch count). The connection manager 230 executes 620 the routing instruction 620, which may include sending a message or sending another communication to maintain a network connection 217. For a deletion routing instruction, the connection manager 230 defers deleting the message until after verifying that the completion condition has been met. The connection manager 230 increments 625 the relinquish count for each received routing instruction identifying a message. The connection manager 230 determines 630 whether the relinquish limit equals the relinquish count, or whether the completion condition has been met. If 630 the relinquish count equals the relinquish limit or if the completion condition has been met, the connection manager 230 deletes 635 the message identified by the message handle from the state store 250. If 630 the relinquish count is not equal to (or less than) the relinquish limit, if the completion condition has not been met, or after deleting 635 the message, the process ends 640.

Returning to the extended example discussed with respect to FIG. 5, two connection managers 230 receive 605 routing instructions for a message. In this example, assume the second connection manager 230 receives 605 the second routing instruction to delete the message before the first connection manager 230 receives 605 the first routing instruction to send the message. The second connection manager 230 determines 610 that the second routing instruction includes a completion condition, so the second connection manager 230 sets 615 the relinquish limit for the message according to the completion condition (e.g., to the touch count). The second connection manager 230 also increments 625 the relinquish count for the message. Supposing the relinquish count has been initialized to zero, the second connection manager increments 625 the relinquish count to one. The second connection manager 230 determines 630 that the relinquish count (incremented to one) does not equal the relinquish limit (set to two), so the second connection manager 230 infers that the message is still being used by another connection manager 230 and does not proceed with the actual deletion.

Continuing the extended example, the first connection manager 230 receives 605 the first routing instruction. The first connection manager 230 determines 610 that the first routing instruction does not include a completion condition and accordingly proceeds to execute 620 the routing instruction by sending the message through a network connection 217 specified by the first routing instruction. The first connection manager 230 increments 625 the relinquish count from one to two. The second connection manager 230 determines 630 that the relinquish count (incremented to two) equals the relinquish limit (set to two) and accordingly deletes 635 the message. By tracking the completion state of the message, the first and second manager 230 avoid deleting the message before the message is sent even though the second routing instruction to delete the message is initially processed before the first routing instruction to send the message.

Message Queue Fairness

There a number of ways for a server, generically, to schedule handling of messages from many different connections. A simple approach attempts to be fair to all connections by doing a round robin read from the different connections. In each "round", the server would read at most one message per connection. This way, if one connection was flooding the server with messages, other connections would have the opportunity to send their own messages.

Server 120's use of connection managers 230 may use a variant of this simple approach. Here, server 120 has many connection managers 230 to loop through, each of which has one or more, usually many, connection. To implement this variant, each connection manager 230 reads a finite number of messages from one of its connections (e.g., 1 message, 2 messages, 10 messages, etc.) and forwards it the router 240 over its associated message queue 235 (e.g., using a POSIX message queue as introduced above). If the queue 235 is full, the connection manager will add it to an internal in-memory queue. If the internal queue ever fills to a threshold number of messages (e.g., 1,000 messages), the connection manager 230 stops reading new messages from connections and providing them to the queue 235 until the router 240 catches up and the queue clears, at least below the threshold number of messages (e.g., 1000) or below some other specified number of queue messages (e.g., 100).

During this round-robin process, the router 240 does a round-robin with each connection manager's message queue 235. In each round, it reads at most a finite number of messages from each connection manager (again, examples include 1 message, 2 messages, 10 messages, etc.).

Figure 7A:
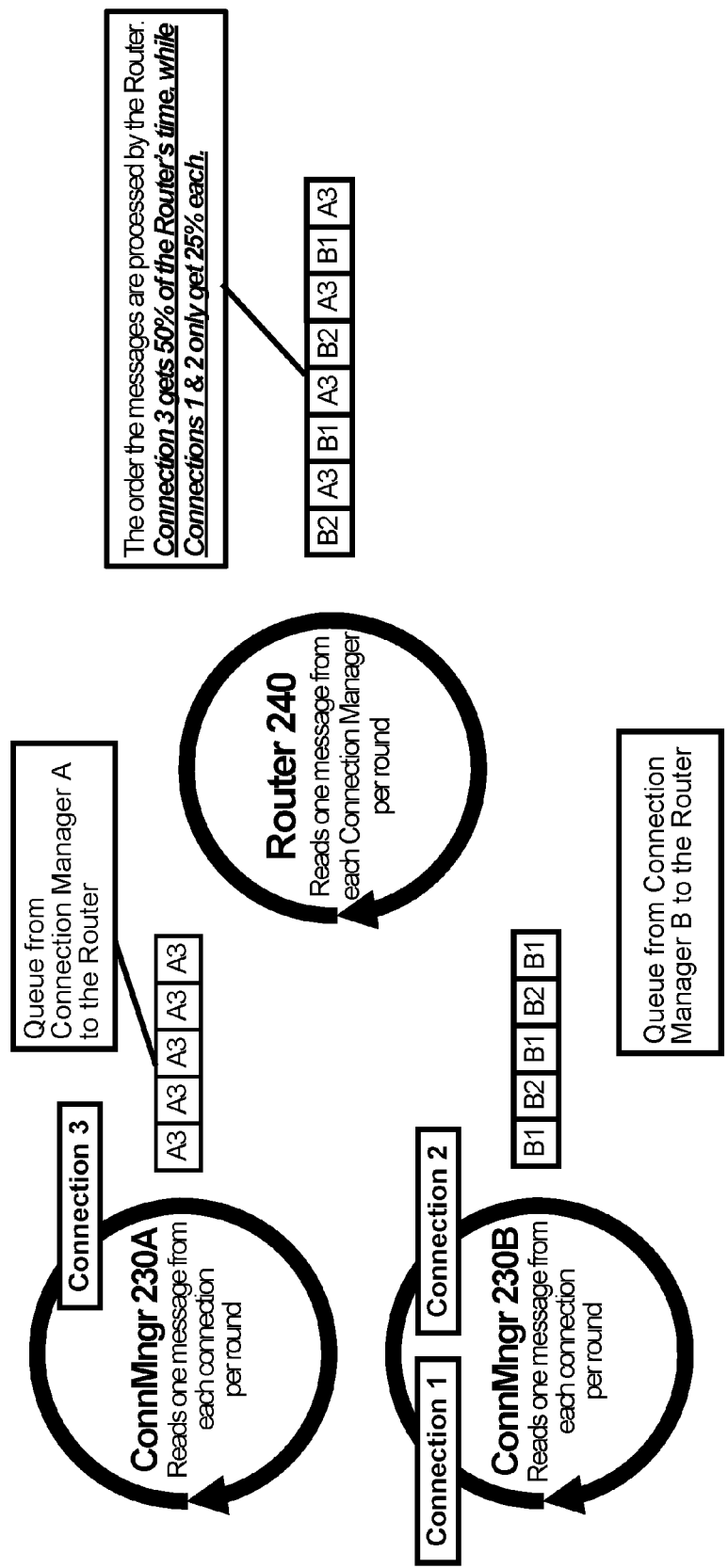
FIG. 7A is a diagram illustrating an example issue that can arise with fairness in message routing across multiple connection managers, in accordance with an embodiment.

This approach is advantageous for its simplicity. However, it does not provide true fairness is some cases. Consider a first issue that may arise, using a simple example where server 120 includes two connection managers 230A and 230B. Connection manager 230A has one connection (connection 3) sending a large volume of messages, while connection manager 230B has two connections (connections 1 and 2) sending lots of messages. In this example, connection 3 receives 50% of the router's 240 capacity, which the other two connections (connections 1 and 2) each only get 25% each. FIG. 7A illustrates this example case.

A second issue with a generic server's implementing the simple approach is due to the fact that the messaging system has multiple processes running simultaneously. If the system had only a single process and if the routing logic was temporarily slow, then the entire process would slow down. As such, it would have no impact on fairness since it would only read a single message at a time across all remote connections 217 and completely process it before reading the next message. In contrast, in an implementation with multiple connection managers 230, the connection managers can continue reading and queuing messages in the above-mentioned internal (in-memory) queue from connections 217 even when the router 240 is slow. The idea behind queuing the messages is to ensure there are messages ready to be processed when the router 240 speeds up. As above, the internal queue can store some finite number of messages (e.g., 1,000). After that, the connection manager 230 will stop reading from client connections until the queue goes down (e.g., down to 100).

However, even in a multiple connection manager implementation, a single connection may still fill up the entire internal queue, starving out other connections. The router 240 will therefore spend most of its time processing messages from a single connection instead of being fair.

Figure 7B:
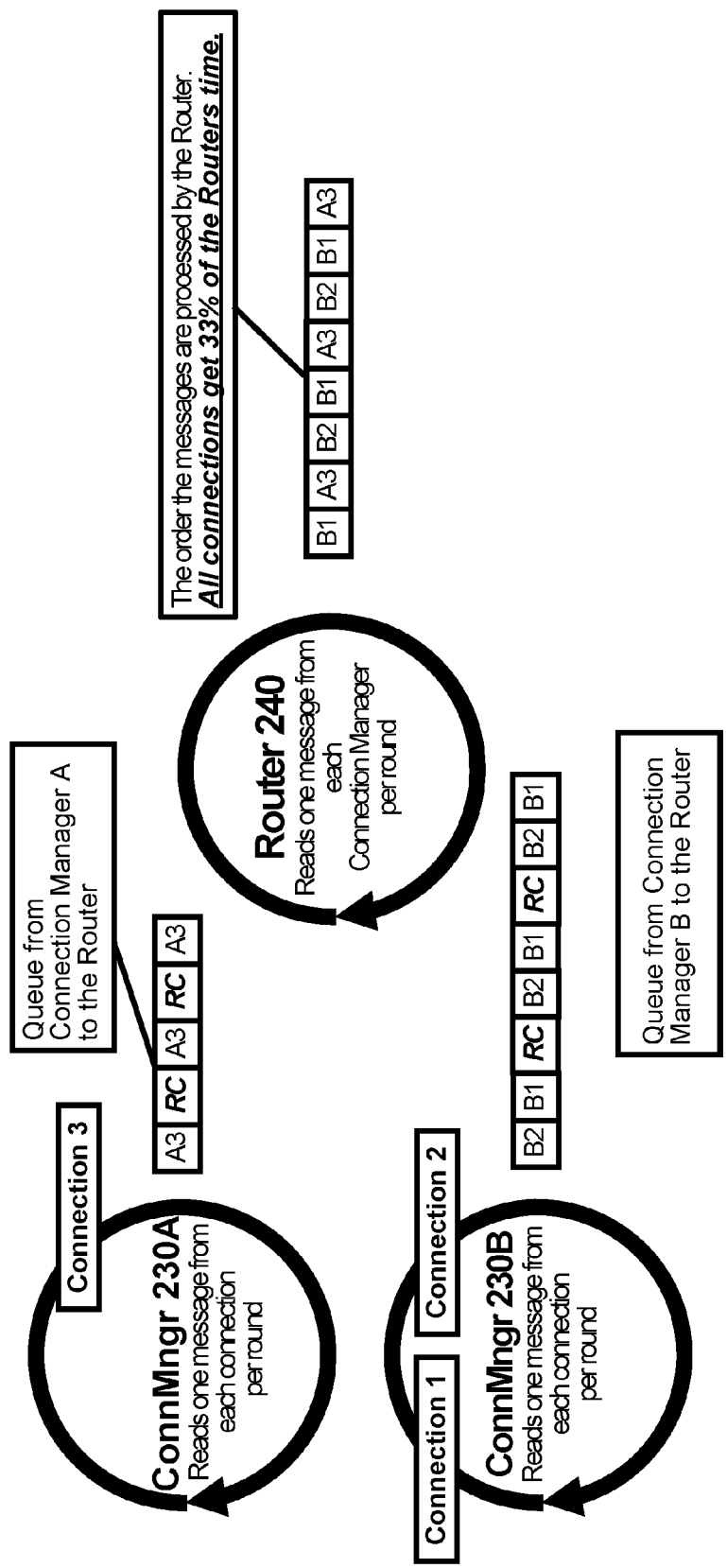
FIG. 7B is a diagram illustration an example solution to the example issue illustrated in FIG. 7A, in accordance with an embodiment.

The first and second issues may be addressed as follows:

Regarding the first issue, a "round complete" control message is introduced that the each connection manager 230 will send to the router 240 after it completes each "round." Instead of reading one message at a time from each connection manager 230, the router 240 will read messages from each connection manager 230 until it receives this round complete control message, or there are no more messages available from the connection manager 230. A round complete flag may be sent as a last message or alternatively sent within a regular message (as an optimization), if the connection manager 230 knows it is the last round. FIG. 7B illustrates this example solution.

Regarding the second issue, the internal queue in each connection manager 230 and IPC queues 235 between each connection manager 230 and the message router 240 is relatively small in size. The small size limits the number of messages that a single connection can burst when the message router 240 is processing slowly. As mentioned above, the internal queue for the connection manager is only used when the IPC queue 235 for that connection manager is full. Once the internal queue is also full, the connection manager 230 will read at most one additional message from each client application 205 and then stop reading messages from client applications 205 until the queue has space again. Note that this one additional message puts the internal queue over capacity by the number of client applications with connections to that connection manager. The limit ensures fairness as other client applications 205 will be guaranteed message router 240 CPU processing time in the event of a flood of messages. As mentioned above, the connection managers 230 only stops reading from the client connections 205 when their respective internal queues are full. When the internal queue is full, that connection manager 230 still continues reading messages from the dispatcher 220 and those read messages to its internal queue. Note that this means that reading from the dispatcher 220 may put or continue to put the internal queue over capacity. Without this logic, newly dispatched connections 330 sent over the IPC socket connection 225 could be lost (and therefore closed) if the dispatcher 220 is restarted for any reason and the connection manager 230 has not yet read them from the IPC socket connection 225. To avoid starvation caused by a flood of dispatcher 220 messages (e.g., handoffs, commands, other types of messages), the connection manager 230 does not count queued dispatcher 220 messages when evaluating the size of the internal queue, which again is the trigger that the connection manager 230 uses to determine whether to read additional messages from the client applications 205. This way, the connection manager 230 will continue read client application messages 205 despite a flood of dispatcher 220 messages.

The process described in the preceding paragraph may also be implemented in a system that does not use both an internal queue and an IPC queue 235 for each connection manager 230, but instead uses the IPC queue 235 to perform both the functions described above throughout this description and which also performs the functions of the internal queue as well. In such an implementation, the connection manager 230 is able to determine how many client application 205 messages are in the IPC queue 235, whether the IPC queue 235 is full based on those client application messages 205 (thus ignoring dispatcher messages as described above). Further, the connection manager 230 is able to cause the IPC queue 235 go over capacity as described in the previous paragraph with one additional message from each client application 205 or with additional dispatcher 220 messages.

As an alternative to the technique described above of reading at most one additional message from each client application 205 and then stopping reading messages from client applications 205 until the queue has space again, in another implementation, the following steps are taken. The current select round is completed. A select round is when the connection manager goes back to the operating system to see if there are any messages to read or write. In one embodiment, this is a POSIX select call. However, in completing the select round, rather than reading from the remaining connections, the connections are added to a pending list by the connection manager 230. For example, if the connection manager sees that there is data on socket 4 (i.e., connection 4), the connection manager adds socket 4 to the pending list. After each select round, the connection manager 230 checks its own small queue to see whether the small queue is full and/or how many messages are in queue. Based on this information, the connection manager 230 can infer whether the router 240 can process more messages. If it can, the connection manager 230 attempts to read from the connections in the pending list (e.g., read from socket 4) and process their events (messages). If the pending list is empty, a round complete control message (see solution to the first issue described above) is sent from the router 240 to the connection managers 230 that unlocks all client connections for read. If the list cannot be emptied, which will happen if the threshold for the small queue is hit again while iterating, the connection manager stops going through the list and wait until the next round to see if the small queue to the router has available space. The implementation of this paragraph may be implemented using either an internal queue and an IPC queue 235 for each connection manager, or alternatively a single IPC queue 235 may be used performing the functions of both queues.

Additional Configuration Information

In the client device 110 and messaging system 120, the program code and modules implementing the functionality described herein are not native components of underlying machine or system, and thus extend the operations and functionality thereof beyond their generic functions and capabilities. The client device 110 includes a client application 205, and the messaging system 120 includes a dispatcher 220, a connection manager 230, a message router 240, and a state store 250. Those of skill in the art will appreciate that these databases, information, data structures, program code, and modules are not components of a generic computer, and that the client device 110 messaging system 120 may contain other databases, program code, or modules that are not explicitly mentioned here. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for constructing establishing connections with a messaging-oriented middleware system, sending messages through the messaging system, and updating the messaging system. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method of routing messages within a messaging system comprising component programs including a message router and a plurality of connection managers, the message router connected to each of the plurality of connection managers via a queue associated with the connection manager, the method comprising:
  sending, from a first connection manager of the plurality of connection managers to its associated first queue, at least one message, wherein one of the at least one message either includes or is followed by a first round complete flag indicative of a last message of the at least one message to be read in order by the message router;
  sending, from a second connection manager of the plurality of connection managers to its associated second queue, at least one message, one of the at least one message either including or followed by a second round complete flag;
  reading, at the message router, messages from the first queue until the first round complete flag is read; and
  responsive to reading the first round complete flag from the first queue,
    reading, at the message router, messages from the second queue associated with the second connection manager until the second round complete flag is read; and
  responsive to reading the second round complete flag from the second queue, reading, at the message router, messages from a third queue associated with a third connection manager of the plurality of connection managers.

2. The method of claim 1, further comprising:
reading a client message at the first connection manager from a client application that has a connection with the first connection manager;
responsive to the first queue being full, storing the client message in an internal queue associated with the first connection manager.

3. The method of claim 2, further comprising:
responsive to the first queue having space available for new messages, forwarding a message in the internal queue to the first queue.

4. The method of claim 2, further comprising:
responsive to the internal queue being full, reading one additional message from each client application having a connection with the first connection manager; and
adding the one additional message from each client application to the internal queue despite the additional messages putting the internal queue over capacity.

5. The method of claim 2, wherein the internal queue is full, the method further comprising:
wherein the messaging system additionally comprises a dispatcher component program that manages the connection managers,
reading a dispatcher message at the first connection manager from a socket connection with the dispatcher; and
adding the dispatcher message to the internal queue regardless of whether the internal queue is full or over capacity.

6. The method of claim 2, the method further comprising:
wherein the messaging system additionally comprises a dispatcher component program that manages the connection managers,
evaluating a size of the internal queue, the size comprising a count of client messages but not dispatcher messages received from the dispatcher in the internal queue; and
responsive to the size of the internal queue being less than a full capacity of the internal queue, reading messages from the client applications that have connections with the first connection manager.

7. The method of claim 1, wherein the queues connecting each connection manager with the router are inter process communication (IPC) queues.

8. The method of claim 1, wherein sending the at least one message by the first connection manager comprises:
wherein the first connection manager is connected to one or more client applications,
reading one message from each of the one or more client applications having a connection with the first connection manager until all of the connections have been read from or until the first queue is filled.

9. The method of claim 2, wherein responsive to the first queue being filled, the method additionally comprises:
adding, by the first connection manager, one or more remaining unread connections, each between the first connection manager and a client application, to a pending list;
checking, by the first connection manager, the first queue to infer whether the message router can process more messages; and
responsive to inferring that the message router can process more messages, reading, by the first connection manager, at least one additional message from one or more of the remaining unread connections in the pending list; and
sending, from the first connection manager to the first queue, the at least one additional message read from each of the one or more remaining unread connections in the pending list until the pending list is emptied of remaining connections or until the first queue is filled again.

10. The method of claim 9, wherein inferring whether the message router can process more messages comprises checking the first queue to determine at least one from the group consisting of whether the first queue is full, and how many messages are queued in the first queue.

11. The method of claim 10, further comprising:
responsive to the pending list being empty of remaining connections, sending the round complete flag along with a last of the additional messages, or as a separate message after the last additional message.

12. The method of claim 11, wherein responsive to the first queue being filled again, the method comprises:
resuming sending additional messages from the remaining connections in the pending list from the first connection manager to the first queue in subsequent select rounds until the pending list is emptied.

13. A system, comprising:
one or more messaging servers each comprising a set of component program modules, the component programs comprising:
a dispatcher, configured to, responsive to receiving a connection request from a client application, establish a network connection with the client application and transfer the network connection to a connection manager;
a plurality of connection managers, each configured to process and transfer messages between client applications, wherein a connection manager is communicatively coupled to a client application by the network connection transferred by the dispatcher, wherein the communication manager is communicatively coupled to the dispatcher by a separate connection;
a message router, configured to generate routing instructions used by the connection managers to direct messages sent between client applications, wherein the message router is communicatively coupled to the dispatcher by a socket connection, wherein the message router is connected to each of the plurality of connection managers through a plurality of messaging queues each associated with one of the plurality of connection managers; and
a state store, configured to store information about states of connections as well as routing states of the messages and delivery states of the messages, wherein the state store is independent from memory allocated to the component program modules, wherein the state store is communicatively coupled to each of the component program modules by memory connections between each of the component program modules and the state store;
wherein the message router is configured to read messages from a first queue of the plurality of messaging queues until a first round complete flag is read, the first round complete flag indicative of a last message to be read in order from the first queue, and wherein the message router is configured to, responsive to reading a round complete flag, read messages from a second queue of the plurality of messaging queues.

14. The system of claim 13, wherein the dispatcher is coupled to the connection manager by a first transport-layer network and the connection manager is coupled to the client application by a second transport-layer network.

15. The system of claim 13, wherein the dispatcher is communicatively coupled to the connection manager using a plurality of IPC socket connections.

16. The system of claim 13, wherein each messaging queue comprises a first in, first out queue.

17. The system of claim 13, wherein the dispatcher is configured to transfer the network connection to the connection manager responsive to selecting the connection manager according to a load balancing mechanism.

18. The system of claim 13, wherein the connection manager is configured to notify the message router of a received message by forwarding a reference to the received message to the messaging queue associated with the connection manager.

19. The system of claim 18, wherein the reference to the additional message includes at least one of a message handle and a message header.

20. The system of claim 13, wherein the state store contains a table of connection states describing the network connections.

\* \* \* \* \*